United States Patent
Flores

(10) Patent No.: US 11,704,713 B1
(45) Date of Patent: Jul. 18, 2023

(54) MOBILE CUSTOMIZED GLITTER CREATION SYSTEM

(71) Applicant: Shawndra Flores, Fort Worth, TX (US)

(72) Inventor: Shawndra Flores, Fort Worth, TX (US)

( * ) Notice: Subject to any disclaimer, the term of this patent is extended or adjusted under 35 U.S.C. 154(b) by 205 days.

(21) Appl. No.: 17/243,310

(22) Filed: Apr. 28, 2021

(51) Int. Cl.
*G06Q 30/00* (2023.01)
*G06Q 30/0601* (2023.01)
*H04N 7/18* (2006.01)
*B60P 3/025* (2006.01)
*B01F 33/502* (2022.01)
*B01F 33/84* (2022.01)
*G06Q 50/28* (2012.01)

(52) U.S. Cl.
CPC ..... *G06Q 30/0621* (2013.01); *B01F 33/5021* (2022.01); *B01F 33/5023* (2022.01); *B01F 33/8442* (2022.01); *B60P 3/0257* (2013.01); *G06Q 30/0641* (2013.01); *H04N 7/183* (2013.01); *G06Q 50/28* (2013.01)

(58) Field of Classification Search
CPC ..... G06Q 30/0601–0645; G06Q 30/08; G06Q 50/28; B60P 3/0257; B01F 33/5023; B01F 33/8442; B01F 33/5021; H04N 7/183
USPC ................................ 705/26.1–27.2
See application file for complete search history.

(56) References Cited

U.S. PATENT DOCUMENTS

| | | | |
|---|---|---|---|
| 8,175,931 B2 | 5/2012 | Harvill | |
| 10,397,662 B1* | 8/2019 | Bulusu | G06Q 10/00 |
| 10,803,528 B2 | 10/2020 | Mdeway | |
| 2015/0310515 A1* | 10/2015 | Zamer | G06Q 30/0605 |
| | | | 705/26.2 |
| 2018/0122103 A1* | 5/2018 | Chen | G06T 11/001 |
| 2018/0240175 A1* | 8/2018 | Mi | G06Q 30/0621 |
| 2019/0188764 A1* | 6/2019 | Broadus | G06Q 30/0621 |
| 2019/0370873 A1* | 12/2019 | Ing-Gilbert | G07F 13/06 |
| 2020/0098025 A1 | 3/2020 | Walker | |

OTHER PUBLICATIONS

Screen Shots of BulkGlitters.com using Wayback Machine Internet Archive, Bulk Glitters DIY Glitter Mixer, see attached document for specific dates and URLs. (Year: 2020).*

* cited by examiner

*Primary Examiner* — Michael Misiaszek
*Assistant Examiner* — Lindsey B Smith
(74) *Attorney, Agent, or Firm* — Leavitt Eldredge Law Firm

(57) ABSTRACT

A customized glitter system includes glitters, a first glitter having a first color and a first type; a second glitter having a second color and a second type; a customer interface, the customer interface having one or more options from which a customer selects, the one or more options relating to the glitters; a container to receive a customized glitter mix based on the one or more options.

1 Claim, 5 Drawing Sheets

MOBILE CUSTOMIZED GLITTER CREATION SYSTEM

BACKGROUND

1. Field of the Invention

The present invention relates generally to glitter purchasing systems, and more specifically, to a customized glitter creation system for providing a customer with a means to create a customized glitter blend based on their selection of one or more options.

2. Description of Related Art

Glitter purchasing systems are well known in the art and are effective means for customers to purchase glitter from a company. For example, FIG. 1 depicts a conventional method 101, wherein the customer browses a glitter selection and makes one or more selections of pre-made glitters, as shown with boxes 103, 105. The user will then proceed to utilize the selected glitter selected as desired, such as separately or by mixing one or more glitters together, as shown with box 107.

One of the problems commonly associated with method 101 is limited user selection. For example, a customer may desire to have a particular mix of glitter with particular features, colors, and the like, however, the customer is generally limited by the exact pre-made selection provided.

Accordingly, although great strides have been made in the area of glitter purchasing systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
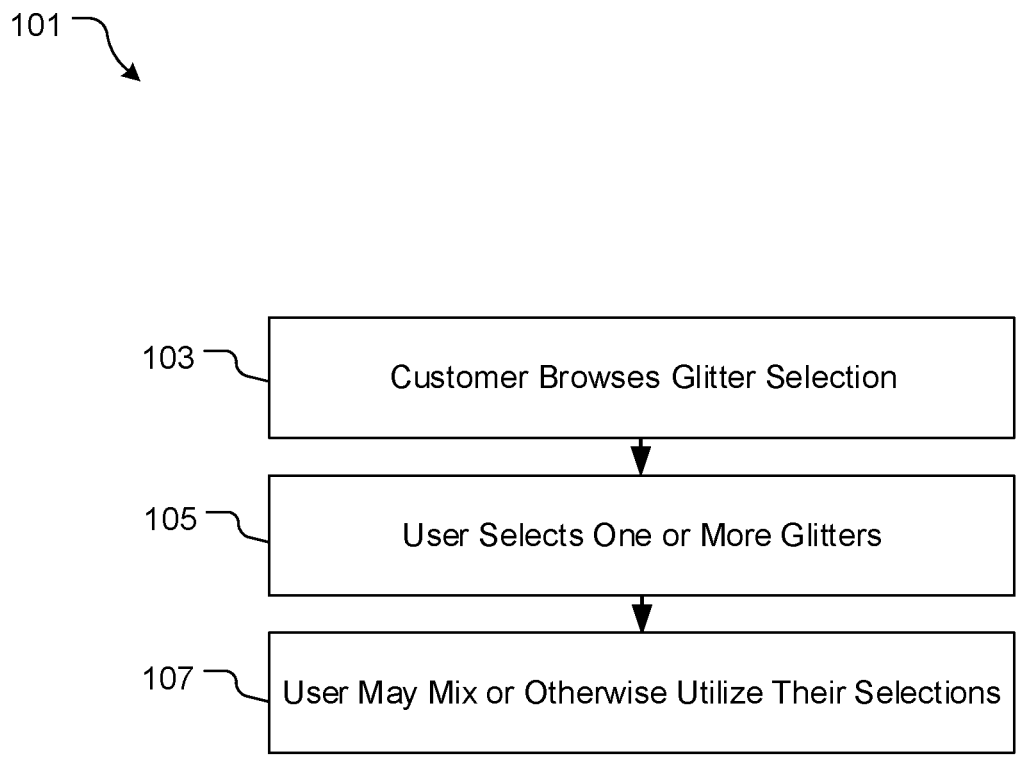
FIG. 1 is a flowchart of a common method of glitter selection.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional glitter selection systems. Specifically, the present invention provides a means for the customer to create a custom glitter blend based off of one or more customer selections. This and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
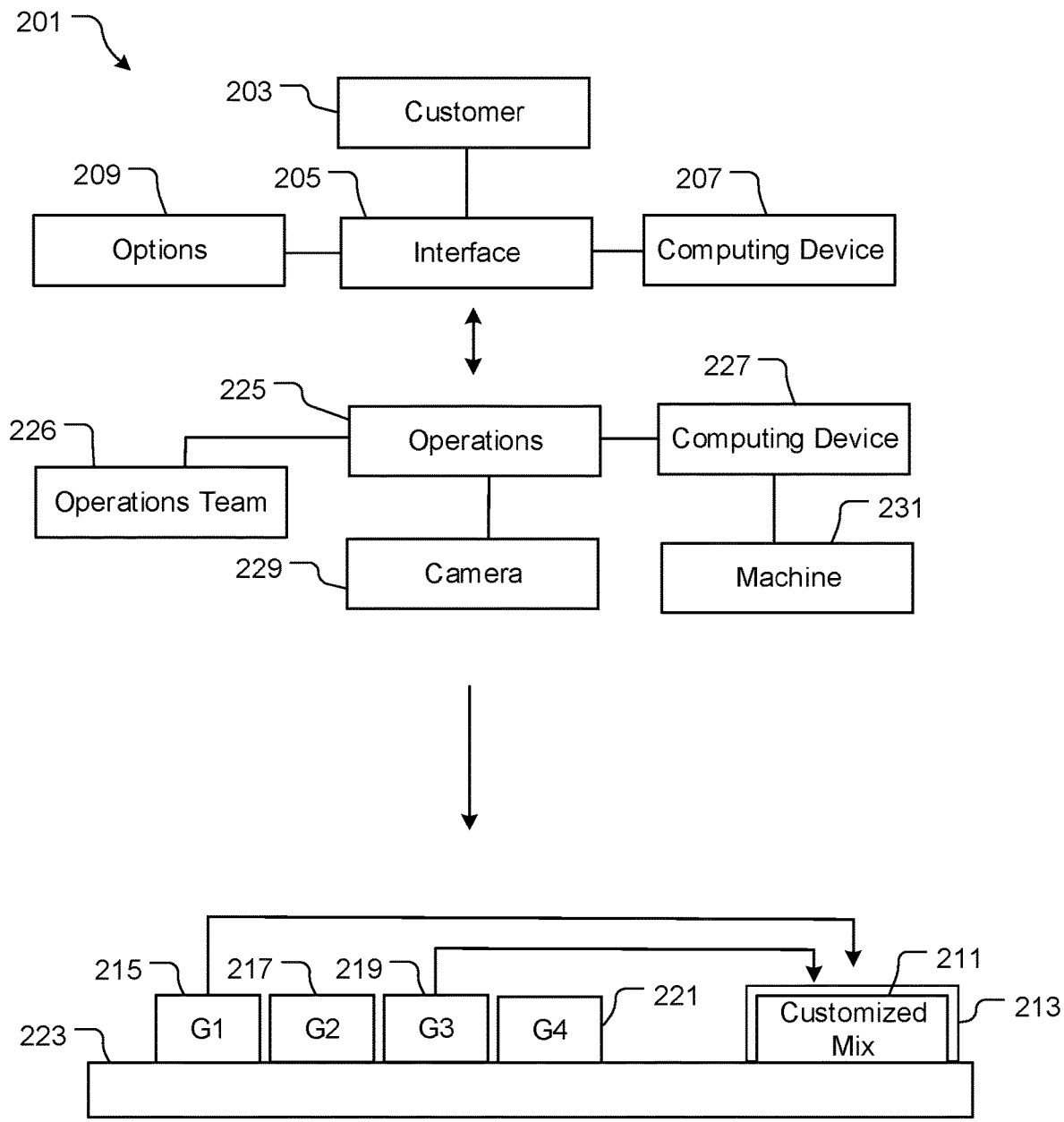
FIG. 2 is a schematic of a customized glitter creation system in accordance with a preferred embodiment of the present application.

Referring now to the drawings wherein like reference characters identify corresponding or similar elements throughout the several views, FIG. 2 depicts a schematic of a customized glitter creation system 201 in accordance with a preferred embodiment of the present application. It will be appreciated that system 201 overcomes one or more of the above-listed problems commonly associated with conventional glitter purchasing systems.

In the contemplated embodiment, system 201 includes a customer 203 interacting with a customer interface 205. It should be appreciated that the customer interface may be tied to a computing device 207 or alternatively may be a non-electronic or digital interface, such as a face to face interface with a physical location.

The interface 205 provides the user with one or more options 209, wherein the user will make selections to create a customized glitter mix 211 to be created in a unique container 213. Within the interface 205 the user will be making selections of one or more glitters 215, 217, 219, 221 to be used to create the customized mix.

In some embodiments, the user will be physically present with the plurality of glitters, such as having the glitters be present on a surface 223 like a table or a similar structure.

In other embodiments, the customer interface 205 with computing device 207 will wirelessly communicate over a network with an operations system 225. The operations system may be a team of individuals 226, or alternatively may be one or more computing device 227. In addition, the operations system 225 may include a camera 229 which will be configured to record the mixing of the one or more glitters into the customized mix. This may be presented to the customer live through the customer interface, thereby providing for a live experience for the user.

It is contemplated that in some embodiments, a mixing machine 231 may be utilized to create the customized mix. The mixing machine may include various control systems, robotic parts, wireless technology, or the like.

Figure 3:
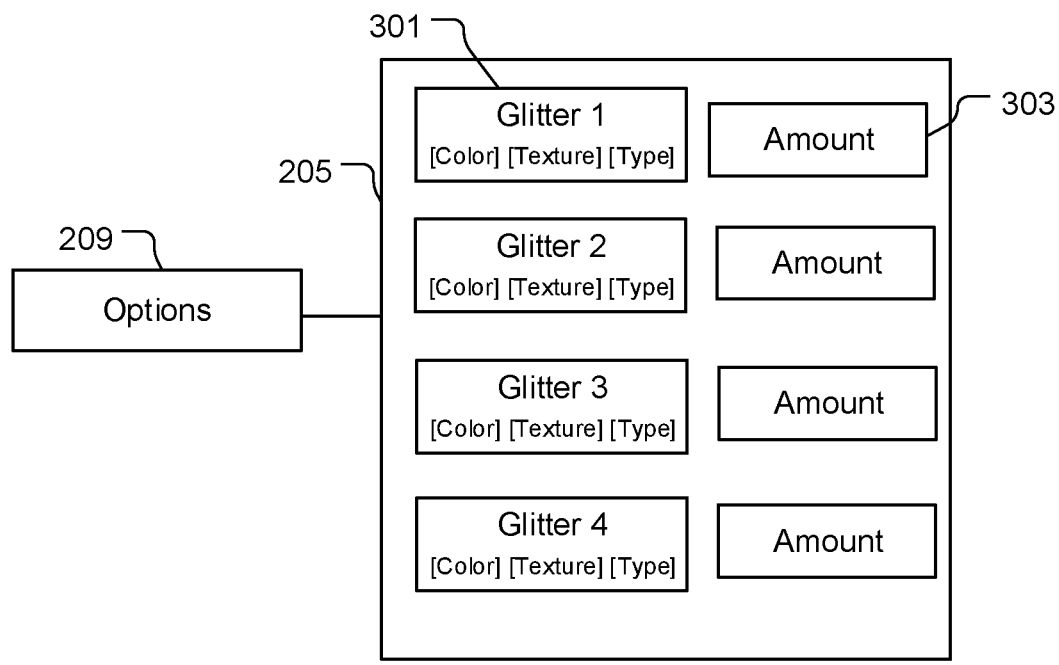
FIG. 3 is a schematic of options provided to a customer via a customer interface in accordance with the present application.

In FIG. 3, a schematic depicts some of the contemplated options 209 presented on the interface 205. As shown, the customer will be provided with various glitter options 301 which may include details such as the color, texture, and type, wherein the user can then select an amount 303 to be incorporated into their customized mix. It should be appreciated that the amount may be a percentage of 100% or other measurement amounts.

It should be appreciated that one of the unique features believed characteristic of the present application is the providing of a means for the customer to create a customized glitter mix based on their preferences.

Figure 4:
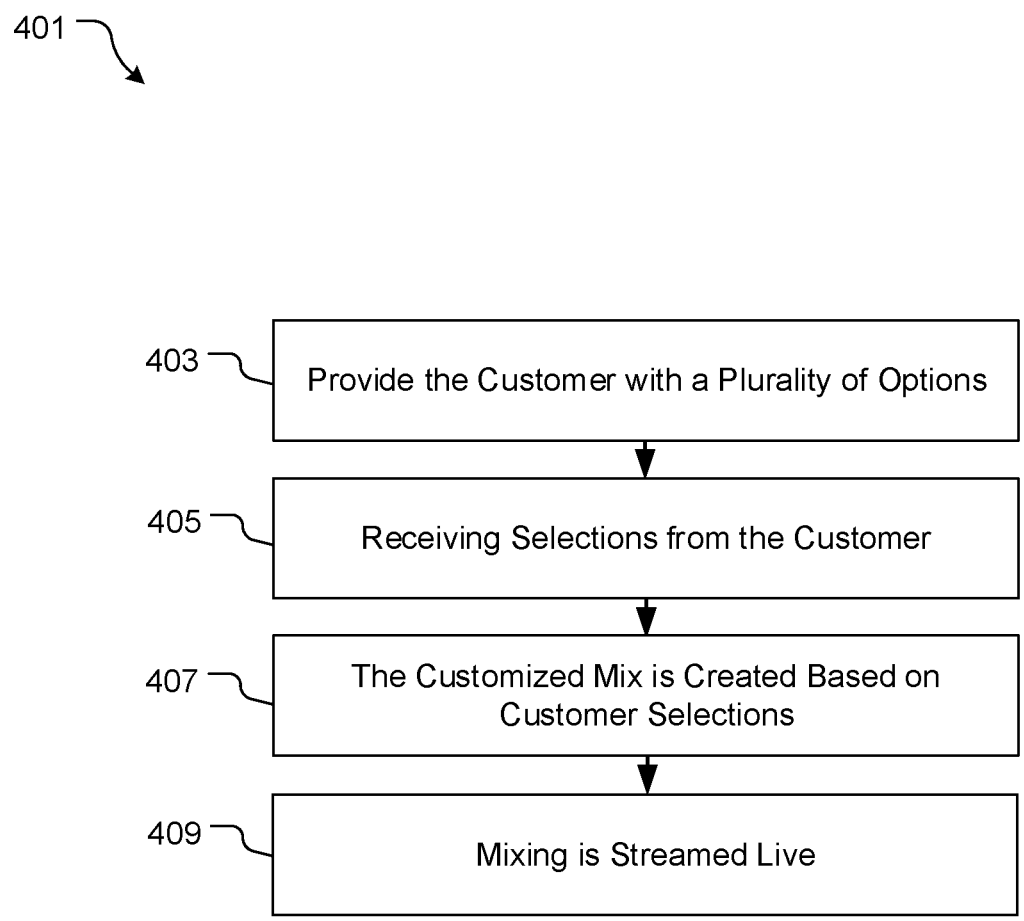
FIG. 4 is a flowchart of a method of operation of the system of the present invention.

In FIG. 4, a flowchart 401 depicts a method of operation associated with the present invention. As shown, the first step is to provide the customer with a plurality of glitter options via an interface, as shown with box 403. The customer will then make one or more selections within the user interface regarding the glitter options, as shown with box 405. Depending on the embodiment, either a live person or a machine will then proceed to create the customized mix based off of the customer selections, as shown with box 407. In some embodiments, the creation of the mix is streamed live to the customer, as shown with box 409.

Figure 5:
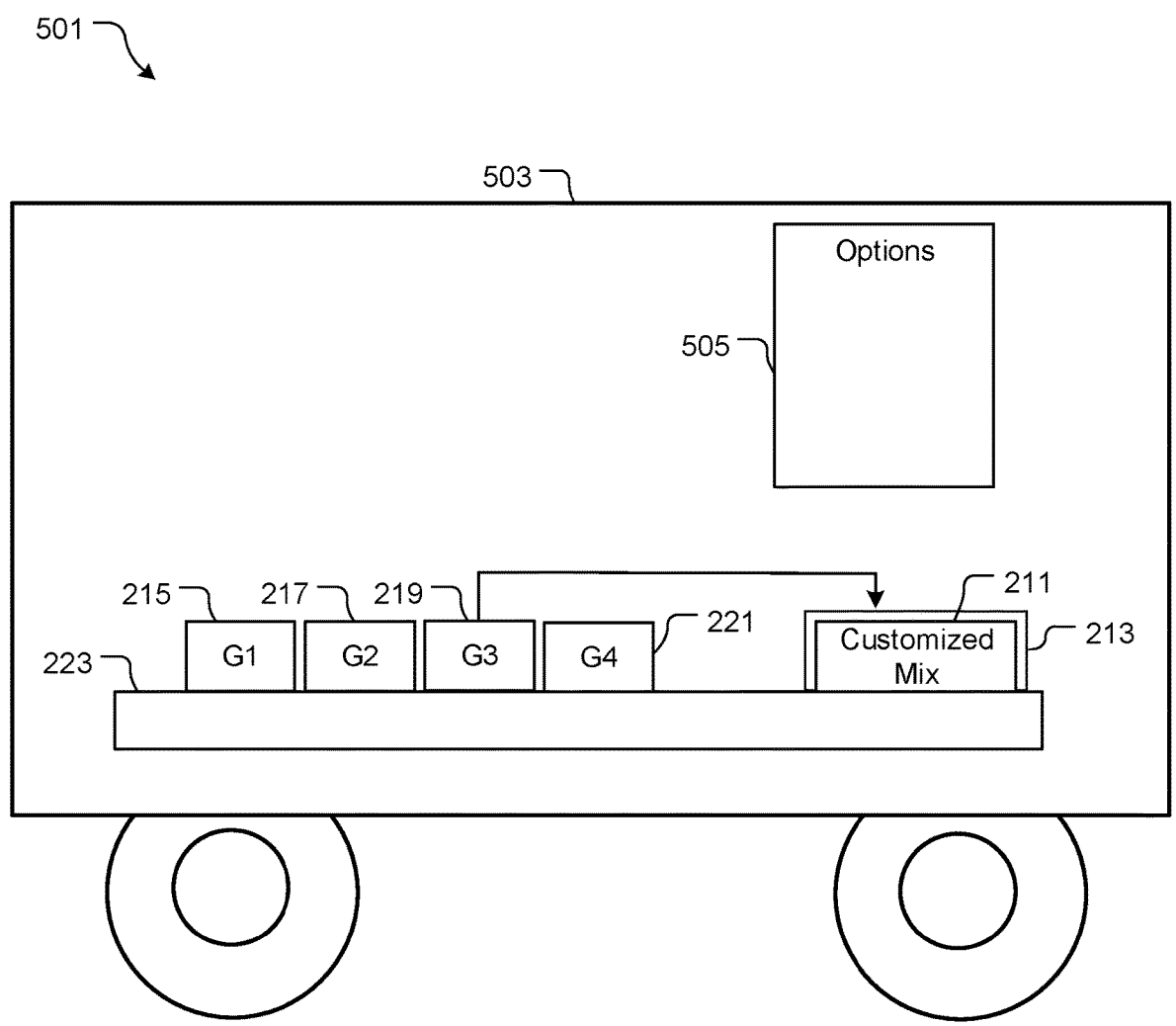
FIG. 5 is a side view of an alternative embodiment of a customized glitter creation system in accordance with the present application.

In FIG. 5, a side view depicts an alternative embodiment 501, wherein a moveable apparatus 503 such as a truck, trailer, or other apparatus is used to create a mobile glitter customization system. In this embodiment, the plurality of glitters 215, 217, 219, 221 are provided with the moveable apparatus 503 to allow for the creation of the customized mix for the customer in person. The customer will be provided with options 505, such as those previously discussed, thereby allowing for the customer to make selections to create a completely customized glitter 211. It is contemplated that the options may be presented on a sign, a plurality of signs, a user interface, word of mouth, or any other means.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A mobile customized glitter system, comprising:
a plurality of glitters, each glitter having a specific color, texture, and type;
a computer device, wherein the computer device is configured to:
  display a customer interface comprising one or more options relating to the plurality of glitters;
  receive, via the customer interface, a first selection of the one or more options relating to the plurality of glitters from a customer, wherein the first selection comprises selecting a first glitter having a first color, a first texture, and a first type;
  receive, via the customer interface, a second selection of the one or more options relating to the plurality of glitters from a customer, wherein the second selection comprises selecting a second glitter having a second color, a second texture, and a second type, wherein the second glitter is different from the first glitter and the first texture is different from the second texture; and
  based on the received selections, display on the customer interface a stream of a custom glitter blend being mixed;
a mixing machine configured to create the custom glitter blend in a container based on the received selections by combining and mixing the first glitter and the second glitter in the container;
a camera configured to stream the creation of the custom glitter blend, wherein the stream is displayed live on the customer interface; and
a movable trailer comprising the plurality of glitters, the computer device, the mixing machine, and the container, wherein the customer is able to watch the creation of the custom glitter blend by viewing the combining and the mixing of the first glitter and the second glitter by the mixing machine in the container while on the movable trailer.

* * * * *